US006237631B1

(12) United States Patent
Giesler et al.

(10) Patent No.: US 6,237,631 B1
(45) Date of Patent: May 29, 2001

(54) LOW SPILL QUICK DISCONNECT COUPLING

(75) Inventors: Dennis C. Giesler, Maple Grove; Jason T. Dunn, Minneapolis; Paul E. LeMay, Shoreview, all of MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/631,711

(22) Filed: Aug. 3, 2000

Related U.S. Application Data
(60) Provisional application No. 60/149,776, filed on Aug. 19, 1999.

(51) Int. Cl.[7] .................................................. F16L 37/28
(52) U.S. Cl. ................................ 137/614.04; 251/149.6
(58) Field of Search ...................... 137/614.04, 614.03, 137/614.05, 614.01, 614; 251/149.6

(56) References Cited

U.S. PATENT DOCUMENTS

| Re. 34,781 | 11/1994 | Spalink et al. . |
|---|---|---|
| 921,691 | 5/1909 | Friday . |
| 2,319,015 | 5/1943 | Speth . |
| 2,805,089 | 9/1957 | Hansen . |
| 2,848,255 | 8/1958 | Klein et al. . |
| 2,966,371 | 12/1960 | Bruning . |

(List continued on next page.)

FOREIGN PATENT DOCUMENTS

| 3406211 | 8/1985 | (DE) . |
|---|---|---|
| 3509371 A1 | 9/1986 | (DE) . |
| 3637176A1 | 5/1988 | (DE) . |
| 88 09 222 | 10/1988 | (DE) . |
| 3904098A1 | 8/1990 | (DE) . |
| 4114465A1 | 11/1991 | (DE) . |
| 4114480A1 | 11/1991 | (DE) . |
| 0 519 129 B1 | 3/1995 | (EP) . |
| 1561337 | 3/1969 | (FR) . |
| WO 97/19289 | 5/1997 | (WO) . |
| WO 98/25068 | 6/1998 | (WO) . |

Primary Examiner—Kevin Lee
(74) Attorney, Agent, or Firm—Christopher H. Hunter

(57) ABSTRACT

A female coupling member for a low-spill, quick-disconnect coupling where a male coupling member has a valve with a conical head projecting axially forward of a forward end of a body of the male coupling member. The female coupling member includes a body having an axially-extending internal cavity with a forward end dimensioned to receive the body of the male coupling member. An annular piston sleeve is spring-biased forwardly within the internal cavity of the female body. A radially-inward projecting annular valve seat in the female body separates a rear cavity portion of the internal cavity from a forward cavity portion. A valve stem assembly is slideably received within the internal cavity of the female body. The valve stem assembly includes i) a poppet valve dimensioned to be sealingly seated forwardly against the valve seat in the female body when the female coupling member is in an uncoupled condition; and ii) a valve stem portion connected to the poppet valve and extending forward of the poppet valve. The valve stem portion includes an enlarged valve head sealingly mating with a valve seat on the piston sleeve when the female coupling member is in the uncoupled condition. The valve head includes a forwardly-opening conical cavity dimensioned to closely receive the conical valve head of the male coupling member. The male coupling member axially-displaces the piston sleeve and the valve stem assembly rearward in the female body away from their respective valve seats when the male coupling member is inserted into the female coupling member to provide a flow path through the female coupling member.

22 Claims, 4 Drawing Sheets

U.S. PATENT DOCUMENTS

| | | |
|---|---|---|
| 3,177,018 | 4/1965 | Goodwin . |
| 3,398,977 | 8/1968 | Yoneda . |
| 3,464,436 | 9/1969 | Bruning . |
| 3,809,122 | 5/1974 | Berg . |
| 4,098,292 | 7/1978 | Evans . |
| 4,181,150 | 1/1980 | Maldavs . |
| 4,543,993 | 10/1985 | Calvin et al. . |
| 4,614,348 | 9/1986 | Fournier et al. . |
| 4,892,117 | 1/1990 | Spalink et al. . |
| 4,921,013 | 5/1990 | Spalink et al. . |
| 5,123,446 | 6/1992 | Haunhorst et al. . |
| 5,129,423 | 7/1992 | Fournier et al. . |
| 5,179,976 | 1/1993 | Boland et al. . |
| 5,211,197 | 5/1993 | Marrison et al. . |
| 5,215,122 | 6/1993 | Rogers et al. . |
| 5,226,682 | 7/1993 | Marrison et al. . |
| 5,406,980 * | 4/1995 | Allread et al. .................. 137/614.03 |
| 5,452,736 | 9/1995 | Arosio . |
| 5,482,083 | 1/1996 | Jenski . |
| 5,709,243 | 1/1998 | Wells et al. . |
| 5,996,624 * | 12/1999 | Ekman ........................... 137/614.03 |

* cited by examiner

LOW SPILL QUICK DISCONNECT COUPLING

RELATED CASES

The present application claims priority to U.S. Provisional Application Serial No. 60/149,776; filed Aug. 19, 1999.

FIELD OF THE INVENTION

The present invention relates generally to quick disconnect-type couplings for fluid lines and fluid systems.

BACKGROUND OF THE INVENTION

For many applications it is desirable to utilize couplings consisting of a male coupling member (nipple) attached to one end of a fluid conduit line and a female coupling member (coupler) attached to an end of an opposing fluid conduit line such that the opposing male and female members may be readily joined together by a simple axial movement of the male nipple into the female coupler. One of the earliest types of these couplings is shown in U.S. Pat. No. 2,966,371. A spring-biased valve on the male coupling member in this patent has a conical head that engages a corresponding conical head of a spring-biased valve on the female coupling member when the coupling members are moved together, causing the valves to move away from respective valve seats and open a flow path through the conduit lines. The valve in the female coupler is retained within a spring-biased, axially-slideable cylindrical sleeve, which includes an annular front surface that mates flush against an annular front surface of the body of the male nipple when the two coupling members are connected together.

For quick disconnect-type couplings, the female coupling member typically has an outer axially slideable release/locking collar or sleeve that controls radial movement of detent/locking balls from a radially outward position when the collar is retracted, to a radially inward position when the collar is urged to its forward position. When the detent balls are in their radially outward position, the male coupling member is free to be readily inserted into or removed from the female coupler, while when the detent balls are in their radially inward position, they engage and retain the male coupling member in the female coupling member.

An example of a prior art fluid coupling utilizing detent balls and a locking collar may be had by reference to U.S. Pat. No. 3,464,436, owned by the assignee of the present application and incorporated herein by reference. Since at least 1988, the assignee of the present invention has also manufactured NS and FF Series Quick Disconnect Couplings through its Quick Coupling Division in Minneapolis, Minn. that included such balls and collars. Reference is also made to International Standard ISO 7241-1 entitled "Hydraulic Fluid power-quick acting couplings" issued by the International Organization for Standardization, First Edition 1987-04-01, Part 1 which sets forth dimensions and requirements for such quick-acting couplings.

For many industrial fluid flow applications, it is desirable that there be a minimal amount of fluid loss and a minimal amount of air inclusion when the male nipple is coupled to or uncoupled from the female coupler. One type of prior art coupling having a push-to-connect feature that provides minimal fluid loss is shown in U.S. Pat. No. 4,181,150, also owned by the assignee of the present application and incorporated herein by reference. In this coupling, a spring-biased ball check valve in the male coupling member is received within a conical seat in a spring-biased valve in the female coupling member. The ball check valve substantially fills the conical space in the valve of the female portion to minimize spills and air inclusion.

While this type of coupling has received wide-spread acceptance in the marketplace, there are some male nipples in commercial use that are not easily and/or fully compatible with the female coupler shown in the '150 patent. These male nipples include a conical valve head extending beyond the body portion of the nipple such as that shown in the above-mentioned International Standard ISO 7241-1. These valve heads would not mate fully with the wider and shallower conical seat for the ball check valve shown in U.S. Pat. No. 4,181,150.

It is known that certain low-spill, quick-disconnect type couplings have been developed to accept such male nipples with conical heads. German reference DE 3904098 A1 for example, shows a low-spill, quick-disconnect type coupling that includes a male coupling member having a conical valve head. The female half of this coupling includes a spring-biased stem valve having a conical opening with a recess that closely receives the valve head of the male half. An annular front surface on the spring-biased sleeve surrounding the conical valve of the female half mates flush against an annular front surface on the body of the male half prior to the valves moving away from their respective valve seats. This close cooperation between the coupling members prevents spills and air inclusion during the connection and disconnection of the coupling halves. U.S. Pat. No. 5,709, 243 shows an essentially identical coupling where the conical head of the valve of the male half is received in a conical recess in the stem valve of the female half, with a spring-biased sleeve surrounding the female stem valve.

The stem valve in the female half of DE 3904098 A1 extends rearwardly, away from the male half, and is fixed via radial links to the female valve body. It is also known to allow the stem valve to move axially rearward a selected amount during connection, and then bottom against a stop to then cause the valves halves to move away from their respective valve seats. This is shown, for example, in German reference DE 4114480 A1 (FIG. 6); German reference DE 8809220.8; U.S. Pat. No. 2,966,371; and U.S. Pat. No. 4,098,292. U.S. Pat. No. 5,709,243 also shows this structure.

While the above couplings have female couplers which allow quick-disconnect for male nipples with conical valve heads, it is necessary to overcome the system pressure applied against the valve sleeve when inserting the male nipple into the female coupler. In addition, high system pressure in the female half can cause leakage between the body and sleeve, and between the sleeve and stem valve after disconnect, which can require high pressure seals and special retainers in some applications. This can limit the usefulness of the couplers, and can add to the material, assembly and maintenance costs.

Thus, it is believed there is a demand in the industry for a further improved low spill, quick-disconnect coupling, and particularly an improved female coupler which can accept male coupling members having valves with conical heads, where the coupling has i) a low coupling force to allow easy connect of the male and female coupling members, and ii) where the female coupler can withstand higher system pressures without leakage or damage to the coupler.

SUMMARY OF THE PRESENT INVENTION

The present invention provides a novel and unique low-spill, quick-disconnect coupling including a female coupling member for male coupling members having valves with conical heads, where the coupling has i) a low coupling force to allow easy connect of the male member with the female member; and ii) where the female coupling member can withstand higher system pressures without leakage or damage to the coupler.

According to the present invention, the female coupling member includes a body having an axially-extending internal cavity. A radially-inward projecting annular valve seat separates a forward (downstream) cavity portion of the internal cavity from a rear (upstream) cavity portion. The female body has a forward end dimensioned to receive the body of the male half in the forward cavity portion of the internal cavity. A cylindrical piston sleeve with an annular front surface is slideably received within the forward cavity portion of the body. A spring urges the sleeve toward the forward end of the female body and against the front annular surface of the male body when inserted. A spring-biased locking sleeve and detent balls are provided for retaining the male coupling member within the female coupling member.

A valve stem assembly is slideably located within the internal cavity of the body. The valve stem assembly includes i) a poppet valve disposed within the rear cavity portion of the internal cavity and dimensioned to be sealingly seated forwardly against the valve seat; and ii) a valve stem portion integrally connected to the poppet valve and extending forward of the poppet valve toward the forward end of the female body. The valve stem portion includes a valve head with a forwardly-opening conical recess configured to closely receive the conical head of the male coupling member. The outer surface of the valve head sealingly mates with the piston sleeve when the female coupling member is in an uncoupled condition.

The piston sleeve is spring-biased forwardly, and through its engagement with the valve head, urges the poppet valve forwardly against the valve seat when the female coupling member is in the uncoupled condition. The poppet valve seals against the valve seat to prevent upstream system pressure from being applied to the piston sleeve. The mating of the valve head and the piston sleeve also prevents any remaining fluid in the forward cavity portion of the internal cavity from leaking out of the female coupling member.

When the male nipple is inserted into the female coupler, the front annular surface of the piston sleeve of the female coupling member mates flush against the front annular surface on the body of the male coupling member. The conical valve of the male coupling member is also closely received in the conical recess in the head of the valve stem of the female coupling. The male coupling member axially-displaces the sleeve and the valve stem assembly rearward in the female body during coupling such that the poppet valve moves rearwardly away from the valve seat and the piston sleeve moves rearwardly away from the valve head of the valve stem portion. The locking sleeve forces the detent balls to retain the male coupling member within the female coupling member when the male half is fully inserted into the female half. Fluid can thereby flow from the female coupling member to the male coupling member.

Thus, as described above, the valve stem assembly with poppet valve prevents system pressure from being applied directly against the piston sleeve when the female coupler is in an uncoupled condition. The system pressure is applied only against the smaller diameter of the poppet valve, which reduces the force necessary to insert the male nipple into the female coupler. The mating piston sleeve and valve head also prevent spillage of any fluid remaining in the forward cavity portion of the female body. Since this fluid is at lower pressures (due to the poppet valve sealing against the upstream valve seat), only low-pressure seals are necessary between the piston sleeve and valve head. A lighter spring can also be used with the piston sleeve, which further reduces the force necessary to couple the male and female coupling members. Leakage between the body and piston sleeve, and between the piston sleeve and valve head is prevented because of the reduced pressures in the forward cavity portion after disconnect.

Further features of the present invention will become apparent to those skilled in the art upon reviewing the following specification and attached drawings.

DETAILED DESCRIPTION OF THE PREFERRED EMBODIMENT

Figure 1:
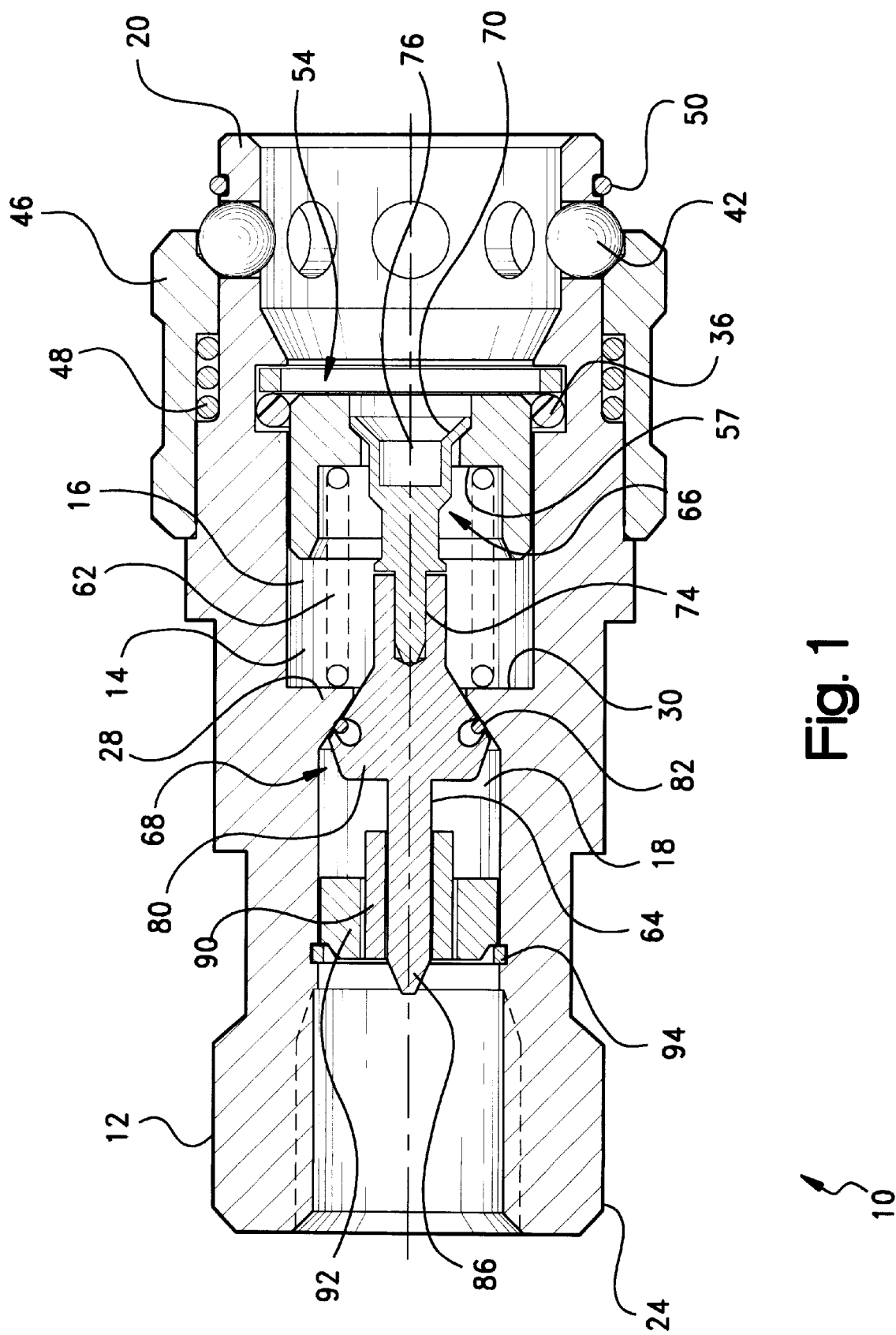
FIG. 1 is a cross-sectional side view of the female portion of the coupler constructed according to the principles of the present invention.
Figure 2:
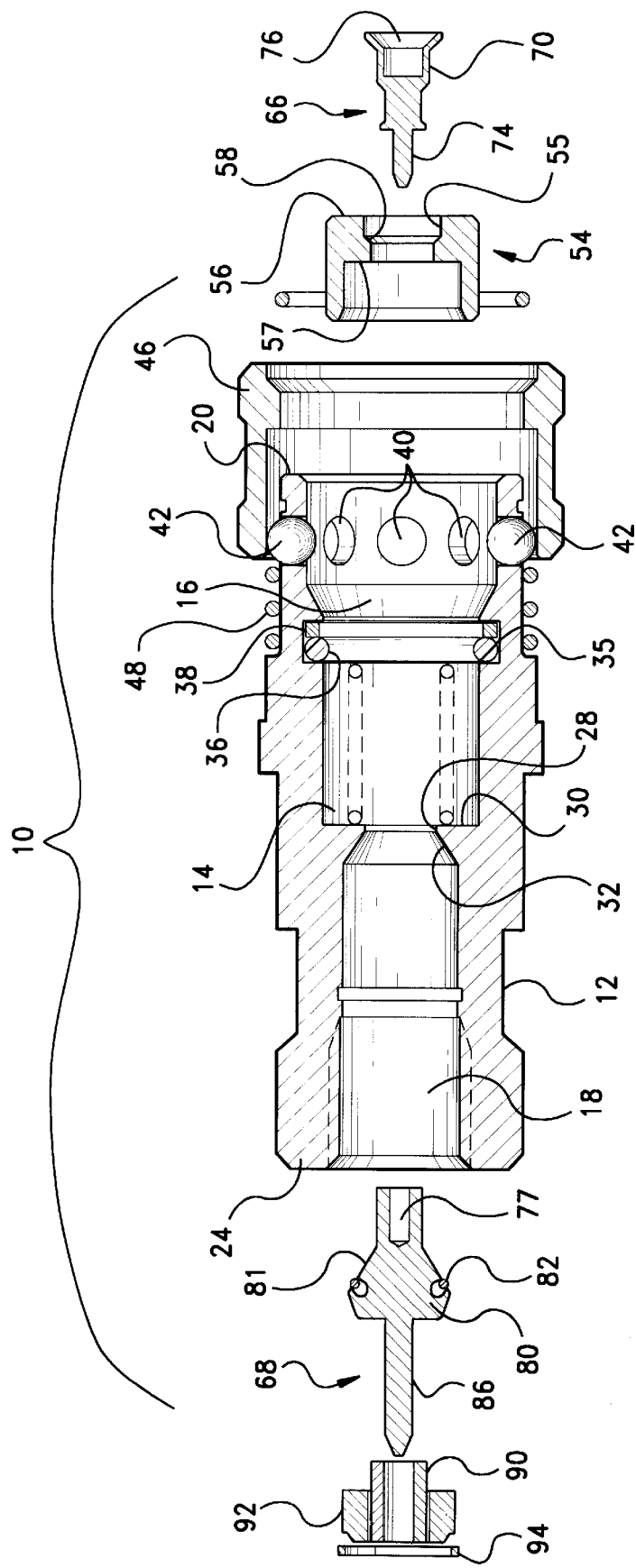
FIG. 2 is an exploded view of the various components for the female coupler of FIG. 1.

Referring to the drawings, and initially to FIGS. 1 and 2, a female coupler constructed according to the principles of the present invention is indicated generally at 10. The female coupler 10 includes a body 12 having an axially-extending internal cavity 14 with a forward (downstream) cavity portion 16 and a rearward (upstream) cavity portion 18. The forward cavity portion 16 is open at the forward end 20 of the body 12, and is designed to receive a male nipple (described below) to form a complete low spill, quick-disconnect coupling. The rear end 24 of body 12 typically includes standard internal threads and an outer geometry to allow the female coupling member to be sealingly connected with a hose or tube in a fluid line or system.

A radially-inward projecting valve seat 28 separates the rear cavity portion 14 of the internal cavity from the forward cavity portion 16. Valve seat 28 includes a flat, annular, forwardly-facing surface or shoulder 30 defining a rear spring support surface; and a conical, rearwardly facing surface 32, which defines a sealing surface.

A radially-inward directed channel 35 is provided toward the forward end 20 of body 12, and receives an O-ring seal 36 and an annular retainer ring 38.

A series of radially-inward tapered, circular openings 40 are provided near the forward end 20 of the body 12. The openings are disposed in an even, spaced-apart manner around the circumference of the body, and are designed to receive detent balls 42. A cylindrical locking sleeve 46 surrounds the forward end of body 12, and is biased forwardly by a compression spring 48 extending between corresponding shoulders of locking sleeve 46 and body 12. Locking sleeve 46 is retained on the forward end of body 12 by snap ring 50 (FIG. 1). As should be appreciated, spring 48 urges locking sleeve 46 forwardly, to urge detent balls 42 radially inward within openings 40. Detent balls 42, in conjunction with sleeve 46, allow the female coupling member to retain a male coupling member, as will be described below.

A cylindrical piston sleeve, indicated generally at 54, is closely and slidably received within the forward cavity portion 16 of body 12. Piston sleeve 54 includes a radially inward-projecting head 55 at its forward end having an annular flat front surface 56, and an annular rear surface 57 at its rear end, defining a front spring support surface. Sleeve 54 further includes an annular valve seat 58 which radially inwardly bounds the head, and has a conical sealing surface that faces toward the forward end of the body 12. A compression spring 62 extends between the rear spring support surface 30 on body 12 and the front spring support surface 57 on piston sleeve 54 to urge piston sleeve 54 forwardly toward the forward end of the body 12. O-seal 36 provides a fluid seal between the piston sleeve 54 and body 12 when the piston sleeve is in the position shown in FIG. 1.

A valve stem assembly, indicated generally at 64, is received within the internal cavity 14 of the body 12. The valve stem assembly 64 includes a valve stem portion, indicated generally at 66, disposed within the forward cavity portion 16; and a poppet valve, indicated generally at 68, disposed primarily in the rear cavity portion 18. The valve stem portion 66 includes an enlarged, conical head portion 70, and a threaded stem 74. The enlarged head 70 has a conical cavity or recess 76 opening toward the forward end of the body, with a configuration designed to closely receive the conical head of the valve in a male coupling member. The outer surface of the enlarged head has a conical configuration which closely and sealingly mates with the valve seat 58 of the piston sleeve 54. The threaded stem 74 extends rearwardly from the head, and is received within an internally threaded bore 77 (FIG. 2) of the poppet valve 68. It is also possible that the valve stem portion 66 could be connected to the poppet valve 68 by other means, such as press-fit, adhesive, welding, etc., or could be formed unitarily in one piece with the poppet valve, however the two-piece construction allows for ease of assembly.

In any case, the poppet valve 68 also includes an enlarged head 80 having a forward conical tapered surface 81 with a configuration that sealingly mates with valve seat 28 to provide a fluid-tight seal between the body 12 and the poppet valve 68. An O-ring seal 82 is provided in the enlarged head 80, and sealingly contacts the opposing surface 32 of valve seat 28 when the poppet valve is in the position shown in FIG. 1. An elongated stem 86 of the poppet valve extends axially rearward from head 80, and is slidingly received within a central circular passage in a sleeve 90 of a rear support wall 92 to guide the poppet valve axially within the body. Rear support wall 92 has a spoke design, and includes axially-extending flow passages to allow fluid to flow through the female coupling half. The rear support wall 92 is prevented from rearward movement within body 12 by snap ring 94.

As should be appreciated, when the female coupling member 10 is in the uncoupled condition as shown in FIG. 1, spring 62 urges piston sleeve 54 forwardly toward the open end of body 12. In so doing, conical valve seat 58 on sleeve 54 sealingly engages the outer conical surface of the enlarged head 70 of the valve stem portion, and also urges the valve stem assembly forwardly. Poppet valve 68 is thereby forced forwardly into sealingly engagement with valve seat 28. Upstream system pressure is applied against the rear surface of the poppet valve to further facilitate urging the poppet valve forwardly to create a fluid-tight seal with the valve seat 28.

Figure 3:
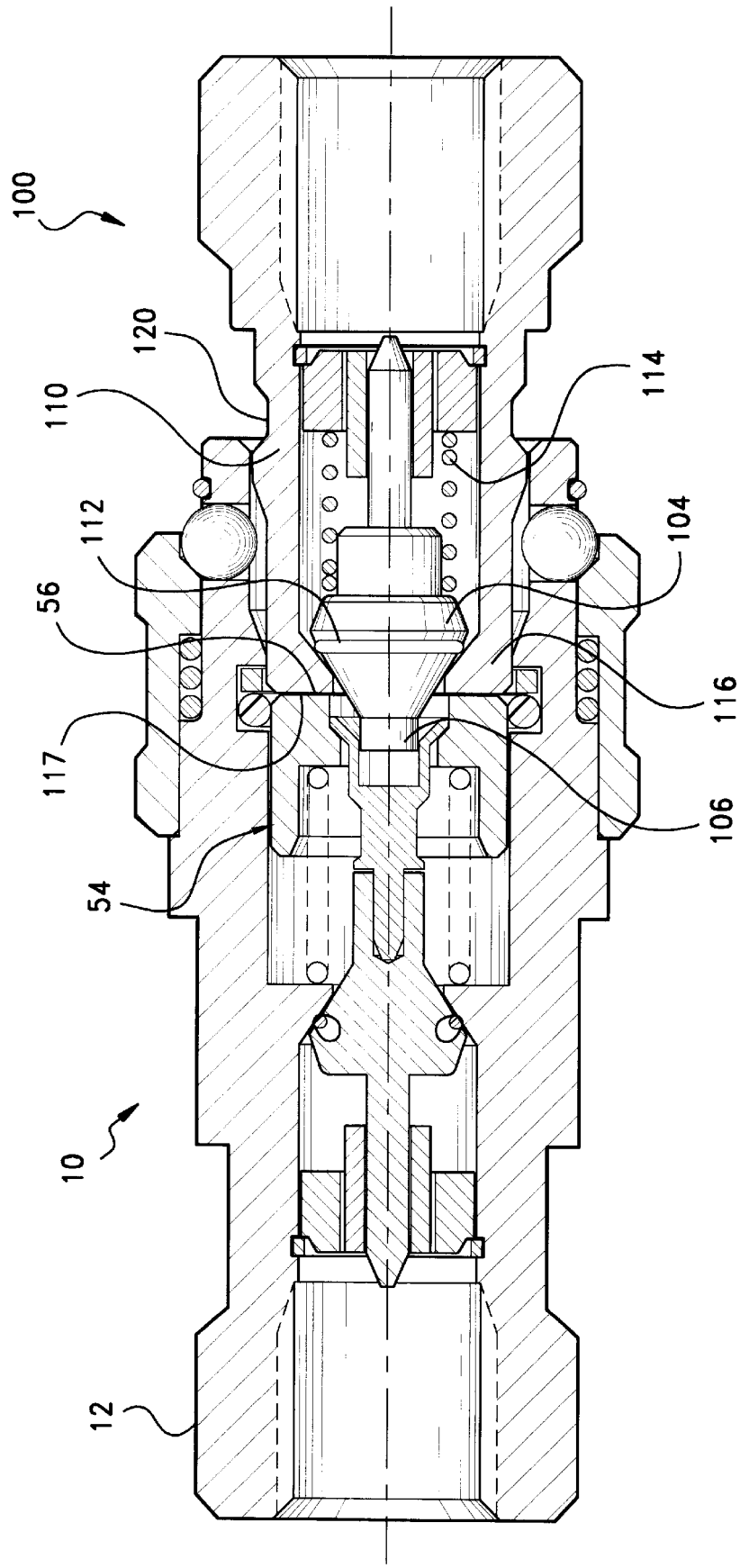
FIG. 3 is a cross-sectional side view of the male and female portions of the coupling when they are first connected.
Figure 4:
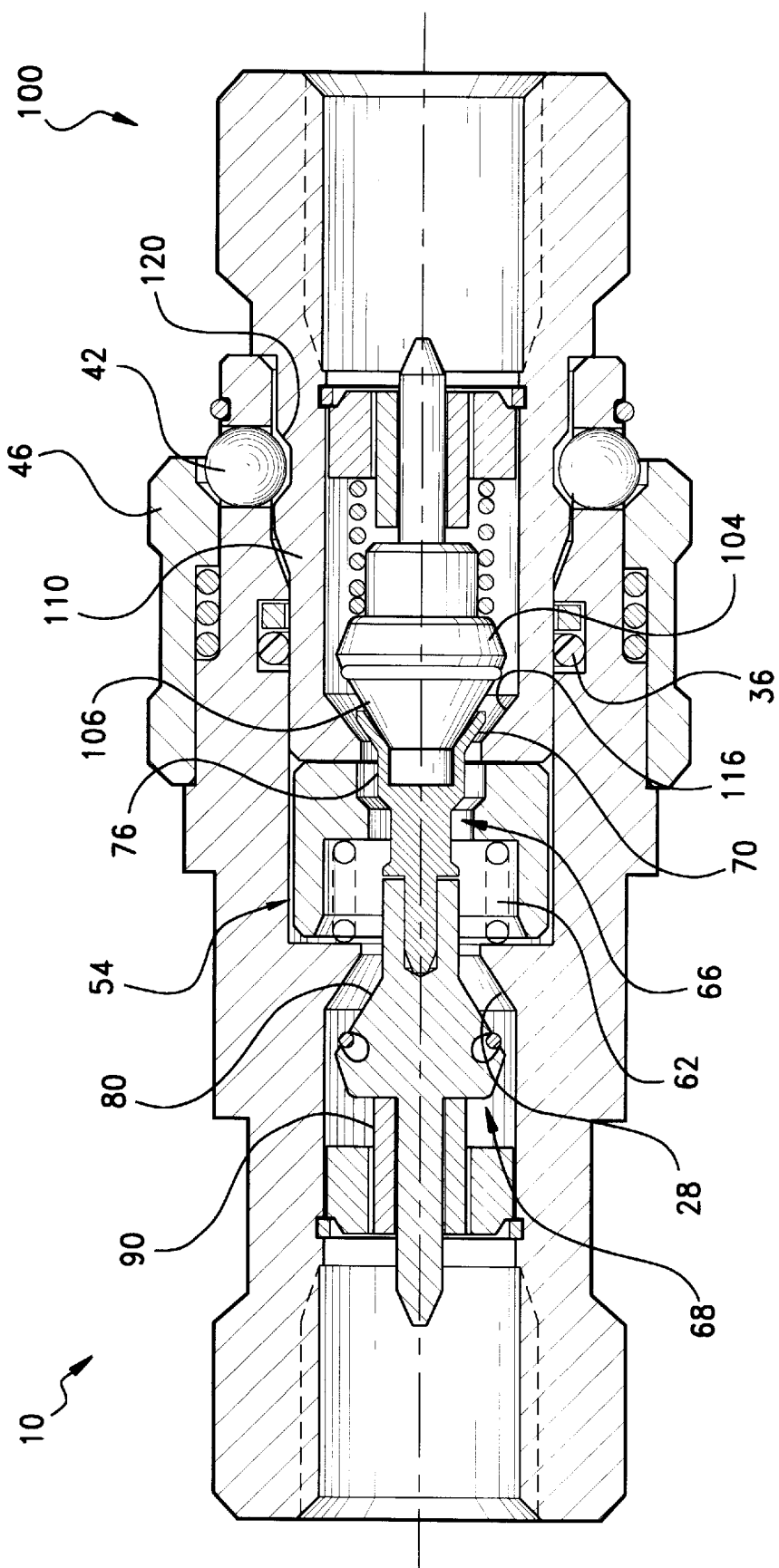
FIG. 4 is a cross-sectional side view of the male and female portions of the coupling when they are fully connected.

Referring now to FIGS. 3 and 4, the female coupler 10 is shown being connected with a male coupling member, indicated generally at 100. The female half 10 described above is particularly useful to be used with a male coupling member 100 which includes a poppet valve 104 having a conical head 106 which projects axially outward from a body 110. Poppet valve 104 includes an O-ring seal 112 surrounding the head of the valve and is spring-biased forwardly by a compression spring 114, such that poppet valve 104 is normally in sealingly engagement against a forward valve seat 116 of the male coupling member, with the conical head 106 extending axially outward beyond the end of the body. The forward end of the body of the male coupling member includes an annular front surface 117 surrounding the projecting head. Reference is made to International Standard ISO 7241-1 entitled "Hydraulic Fluid Power Quick Acting Couplings", issued by the International Organization for Standardization, $1^{st}$ Edition 1987-04-01, Part 1, which sets forth further dimensions and details for such a male coupling member.

In any case, as shown in FIG. 3, when the male coupling member 100 is initially inserted into the open end 20 of female body 12, the front surface 117 of the male body 110 becomes essentially flush with the front surface 56 of the piston sleeve 54. As the male coupling member is inserted further into the female half, as shown in FIG. 4, the conical head 106 of the poppet valve 104 is closely received within the conical cavity 76 of the valve stem portion 66 of the valve stem assembly. Air inclusion in the coupling is minimized by the flush engagement of the forward end surface 56 of sleeve 54 and front end surface 117 of male body 110; as well as the close fit of the male poppet valve 106 in recess 76 of female valve stem portion 66.

The body 110 of the male coupling member 100 axially moves piston sleeve 54 rearwardly against compression spring 62. Detent balls 42 are urged radially inward by sleeve 46, into annular channel 120 of the male half, to retain the male half 100 securely within the female half 10. O-ring seal 36 in female body 12 can be seen as providing a fluid-tight seal with the body 110 of the male coupling member. At this point, the poppet valve 68 has moved rearwardly such that the enlarged head 80 abuts the forward end of sleeve 90, thereby preventing further rearward movement of the valve stem assembly and forcing poppet valve 104 of the male half away from valve seat 116 into an open position, as illustrated in FIG. 4. The poppet valve 68 of the female coupling member has likewise moved rearward away from seat 28, and piston sleeve 54 has moved rearward away from head 70 of valve stem portion 66, thereby opening a flow path through the coupling.

The connect force necessary to push the male nipple into the female coupler is reduced as upstream pressure is only applied against the rear end surface of poppet valve 68, rather than against the rear surface of sleeve 54 (which has a greater effective surface area).

When the male coupling member 100 is to be disconnected from the female coupling member 10, the locking sleeve 46 is moved rearwardly to allow the detent balls 42 to move radially outward from locking engagement in the annular channel 120 of the male coupling member, thereby allowing the male coupling member to be axially moved outwardly away from the female coupling member. As the male coupling member is removed, the poppet valve 104 in the male half initially seals against valve seat 116. The piston sleeve 54 then comes into sealing engagement with the valve head 70. At the same time, O-seal 36 provides a fluid-tight seal between body 12 and piston sleeve 54. The female poppet valve 68 then seals against valve seat 28. Again, upstream fluid is contained by female poppet valve 68. Any residual fluid within forward cavity 16 is retained within the cavity by the sealing connection between the valve stem portion 66 and the piston sleeve 54; and the seal 36 between body 12 and sleeve 54. Since any significant pressure is prevented from being applied to forward cavity portion 16, leakage is prevented or at least minimized between the sleeve 54 and the body 12, and between sleeve 54 and the valve stem portion 66. This allows a lighter spring 62 to be used with the piston sleeve 54, which further reduces the force required to couple the male and female coupling members together.

Thus, as described above, a low-spill, quick-disconnect coupling including a female coupling member for male coupling members having valves with conical heads is provided according to the present invention. The coupling has a low coupling force to allow easy connect of the female coupling member with the male coupling member, and can withstand higher upstream pressures without leakage or damage to the female coupler.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A low-spill, quick disconnect female coupling member connectable to a male coupling member having a valve with a conical valve head projecting forwardly from a forward end of a body, the female coupling member comprising:

a body having an axially-extending internal cavity and a forward end dimensioned to receive the body of the male coupling member in a forward cavity portion of the internal cavity;

a cylindrical piston sleeve slideably received within the forward cavity portion of the female body, the piston sleeve having an annular surface facing the forward end of the female body;

a spring urging the sleeve toward the forward end of the female body;

a radially-inward projecting annular valve seat of the female body separating a rear cavity portion of the internal cavity from the forward cavity portion;

a valve stem assembly slideably received within the internal cavity, the valve stem assembly including i) a poppet valve disposed within the rear cavity portion of the internal cavity and dimensioned to be sealingly seated forwardly against the valve seat when the female coupling member is in an uncoupled condition to prevent fluid flow forwardly through the female coupling member; and ii) a valve stem portion connected to the poppet valve and extending forwardly from the poppet valve toward the forward end of the female body, the valve stem portion including a valve head sealingly mating with the piston sleeve when the female coupling member is in the uncoupled condition, the poppet valve urged forwardly by the spring operating through the engagement of the valve head and the piston sleeve into sealing relation with the valve seat when the female coupling member is in the uncoupled condition, the valve head including a forwardly-opening conical cavity dimensioned to closely receive the conical valve head of the male coupling member, and the annular surface of the sleeve of the female coupling member matable flush against the forward end of the body of the male coupling member when the male coupling member and female coupling member are connected together, the sleeve and the valve stem assembly being axially displaced rearward in the female body when the male coupling member is inserted into the female coupling member such that the poppet valve moves rearwardly away from the valve seat and the piston sleeve moves away from the valve head of the valve stem portion to allow fluid to flow through the female coupling member.

2. The female coupling member as in claim 1, wherein the piston sleeve also includes a valve seat facing toward the forward end of the female body, the valve head of the valve stem portion sealingly engaging the valve seat of the piston sleeve when the female coupling member is in the uncoupled condition.

3. The female coupling member as in claim 2, wherein the piston sleeve includes a radially-inward projecting head, and the enlarged head of the valve stem portion of the valve stem assembly engages the head of the piston sleeve.

4. The female coupling member as in claim 1, wherein the valve seat of the female body has a sealing surface engaging the poppet valve that faces rearwardly away from the forward end of the female body.

5. The female coupling member as in claim 4, further including an annular resilient seal disposed around a head of the poppet valve for sealing against the sealing surface of the valve seat of the female body.

6. The female coupling member as in claim 4, wherein the poppet valve includes an enlarged head portion and a stem portion extending rearwardly from the head portion, and further including a rear support fixed to the female body, the rear support including a passage dimensioned to slidingly receive the stem portion of the poppet valve to guide the poppet valve axially within the female body, the head portion bottoming against the rear support to limit rearward movement of the poppet valve.

7. The female coupling member as in claim 1, wherein the valve stem portion is a separate piece from the poppet valve.

8. The female coupling member as in claim 1, further including an outer sliding locking sleeve, and a set of detent balls carried in openings in said female body and engageable by said locking sleeve to connect the female coupling member to the male coupling member.

9. A female coupling member, comprising:

a body having an axially-extending internal cavity with a rear cavity portion, and forward cavity portion having a forward open end;

a cylindrical piston sleeve slideably received within the forward cavity portion of the body, a spring urging the sleeve toward the forward end of the body;

a radially-inward projecting annular valve seat of the body separating the rear cavity portion from the forward cavity portion;

a valve stem assembly slideably received within the internal cavity, the valve stem assembly including i) a valve stem portion, the valve stem portion including an enlarged valve head toward the forward end of the female body with a forwardly-opening cavity and an outer surface sealingly engaged with the piston sleeve, said piston sleeve urged by the spring forwardly into sealing engagement with the valve head; and ii) a poppet valve connected to the valve stem portion and disposed within the rear cavity portion of the internal cavity, said poppet valve dimensioned to be sealingly seated and urged forwardly against the valve seat by the spring when the piston sleeve is in sealing engagement with the valve head to prevent fluid flow through the female coupling member; the piston sleeve and valve stem assembly being axially-displaceable rearward in the body such that the poppet valve moves rearwardly away from the valve seat and the piston sleeve moves away from the valve head of the valve stem portion to allow fluid to flow through the female coupling member.

10. The female coupling member as in claim 9, wherein the piston sleeve also includes a valve seat facing toward the forward end of the female body, the valve head of the valve stem portion sealingly engaging the valve seat of the piston sleeve.

11. The female coupling member as in claim 10, wherein the piston sleeve includes a radially-inward projecting head, and the enlarged head of the valve stem portion of the valve stem assembly engages the head of the piston sleeve.

12. The female coupling member as in claim 10, wherein the valve seat of the female body has a sealing surface engaging the poppet valve that faces rearwardly away from the forward end of the female body.

13. The female coupling member as in claim 12, further including an annular resilient seal disposed around a head of the poppet valve sealing against the valve seat of the female body.

14. The female coupling member as in claim 12, wherein the poppet valve includes an enlarged head portion and a stem portion extending rearwardly from the head portion, and further including a rear support fixed to the female body, the rear support including a passage dimensioned to slidingly receive the stem portion of the poppet valve to guide the poppet valve axially within the female body, the head portion bottoming against the rear support to limit rearward movement of the poppet valve.

15. The female coupling member as in claim 9, wherein the valve stem portion is a separate piece from the poppet valve.

16. The female coupling member as in claim 9, further including an outer sliding locking sleeve, and a set of detent balls carried in openings in said female body and engageable by said locking sleeve.

17. A low-spill, quick-disconnect coupling, comprising:
i) a male coupling member having a body with an internal cavity and a spring-biased valve slidable within the internal cavity with a conical valve head projecting forwardly of a forward end of the male body; and
ii) a female coupling member having an axially-extending internal cavity with upstream cavity portion, and a downstream cavity portion having a forward open end receiving the male coupling member;
a cylindrical piston sleeve slideably received within the downstream cavity portion of the body, the piston sleeve having an annular surface facing the forward end of the female body and in flush engagement with the forward end of the male body;
a spring urging the sleeve toward the forward end of the female body;
a radially-inward projecting annular valve seat of the female body separating the upstream cavity portion from the downstream cavity portion;
a valve stem assembly slideably received within the internal cavity, the valve stem assembly including i) a valve stem portion, the valve stem portion including an enlarged valve head toward the forward end of the female body with a forwardly-opening conical cavity receiving the conical valve head of the male coupling, and an outer surface sealingly engageable with the piston sleeve when the female coupling member is uncoupled from the male coupling member; and ii) a poppet valve extending forwardly from the valve stem portion and disposed within the upstream cavity portion of the internal cavity, said poppet valve dimensioned to be sealingly seated and urged forwardly against the valve seat by the spring through the engagement of the valve head and the piston sleeve when the female coupling member is uncoupled from the male coupling member to prevent fluid flow through the female coupling member and to contain upstream system fluid; the piston sleeve and valve stem assembly being axially-displaced rearward in the body such that the poppet valve is moved rearwardly away from the valve seat and the piston sleeve is moved rearwardly away from the valve head of the valve stem portion to allow fluid to flow through the female coupling member.

18. The coupling as in claim 17, wherein the valve seat of the female body has a rearwardly-facing sealing surface engageable with the poppet valve when the female coupling is uncoupled from the male coupling member.

19. The coupling as in claim 18, further including an annular resilient seal disposed around a head of the poppet valve for sealing against the sealing surface of the valve seat of the female body.

20. The coupling as in claim 19, wherein the poppet valve includes an enlarged head portion and a stem portion extending rearwardly from the head portion, and further including a rear support fixed to the female body, the rear support including a passage dimensioned to slidingly receive the stem portion of the poppet valve to guide the poppet valve axially within the female body, the head portion bottoming against the rear support to limit rearward movement of the poppet valve.

21. The coupling as in claim 17, wherein the valve stem portion is a separate piece from the poppet valve.

22. The coupling as in claim 17, further including an outer sliding locking sleeve, and a set of detent balls carried in openings in said female body and engaged by said locking sleeve to connect the female coupling member to the male coupling member.

* * * * *